United States Patent [19]

Jinnai

[11] 4,371,878

[45] Feb. 1, 1983

[54] DEVICE FOR CORRECTING INK DOT MISPLACEMENT IN INK-JET PRINTING

[75] Inventor: Koichiro Jinnai, Kawasaki, Japan

[73] Assignee: Ricoh Co., Ltd., Tokyo, Japan

[21] Appl. No.: 242,575

[22] Filed: Mar. 11, 1981

[30] Foreign Application Priority Data

Mar. 17, 1980 [JP] Japan ................................ 55-33789

[51] Int. Cl.[3] ............................................ G01D 15/18

[52] U.S. Cl. ........................................ 346/75; 346/146

[58] Field of Search .................... 346/75, 79, 132, 146

[56] References Cited

U.S. PATENT DOCUMENTS 3,562,757 2/1971 Bischoff .......................... 346/75 X 3,588,906 6/1971 Van Brimer ......................... 346/75

4,313,123 1/1982 Jinnai .................................. 346/75

*Primary Examiner*—Stafford D. Schreyer

*Attorney, Agent, or Firm*—Burgess, Ryan and Wayne

[57] ABSTRACT

In an electrostatic type ink-jet printer of the type leaving "guard drops" between charged drops, an electronic circuit is provided which generates charge-enabling signals in response to which guard drops are charged. When a sync signal is generated which synchronizes the rotation of a rotary drum with a print signal, one of the charge-enabling signals which is timed to charge an ink drop causes this ink drop to be charged. As compared with the prior art, ink dot misplacement due to the out-of-synchronization which in turn is due to the variations in rotation of the rotary drum can be more finely corrected. In addition, ink dot misplacement can be more precisely corrected by controlling the charge on an ink drop by pulses which have divided periods of that of the sync signals and which are synchronized with the sync signals.

4 Claims, 7 Drawing Figures

DEVICE FOR CORRECTING INK DOT MISPLACEMENT IN INK-JET PRINTING

BACKGROUND OF THE INVENTION

The present invention relates to an electrostatic type ink-jet printer and more particularly a device for correcting ink dot misplacement by correctly synchronizing the timing for charging an ink drop emitted through a nozzle of an ink drop generator in response to a signal representative of the print starting point on a recording medium.

In an electrostatic ink-jet printer of the type in which a rotary drum is rotated about its axis and an ink drop print head is transported in parallel with the axis of the rotary drum, printing is started in response to a signal which is generated each revolution of the rotary drum. However, in practice it is extremely difficult to attain exact synchronization of the rotation of the rotary drum with an ink dot printing frequency. In addition, due to the variations in rotation of the rotary drum, it frequently occurs that when the printing is started, an ink dot is placed at a position spaced apart from an intended position by one dot at the most. In order to overcome this drawback, there has been devised a system in which the ink dot placement frequency is increased above a normal running frequency so that the interval between dots is reduced and subsequently ink dot misplacement is reduced. However, the increase in ink dot placement frequency is limited, so that the printing speed is objectionally reduced.

With the ink-jet printer of the type described above, misplacement of ink drops is caused by aerodynamic and electrostatic disturbances while the drops are in flight. For instance, in case of two consecutive ink drops, the succeeding ink drop feels aerodynamic and electrostatic disturbances of the preceding ink drop, so that the succeeding drop is not placed at an intended position. In order to overcome this drawback, there has been proposed a system in which so-called "guard drops" which are not charged are left between pairs of ink drops that are charged and deflected, but this system is not satisfactory in practice.

SUMMARY OF THE INVENTION

According to the present invention, in an electrostatic type ink-jet printer of the type leaving guard drops between charged drops, charge-enabling signals are generated for causing the guard drops to be charged. More specifically one of the charge-enabling signals which is just timed to charge an ink drop when a signal representative of each rotation of a rotary drum is generated causes this ink drop to be charged.

According to the present invention, ink dot positions can be controlled by an interval which is 1/n ($\frac{1}{8}$ in one embodiment of the present invention) as compared with the prior art electrostatic ink-jet printer of the type described.

According to one embodiment of the present invention, the synchronization of the rotation of a rotary drum is performed and a print signal is provided in response to a signal generated each revolution of the rotary drum. According to another embodiment of the present invention, ink dot positions are corrected by controlling the charge on each ink drop in response to pulses the frequency of which is a submultiple of the period of rotation of the rotary drum. Therefore, spacings between ink dots can be corrected more precisely so that no strip pattern will appear in the printed image.

The above and other objects, effects and features of the present invention will become more apparent from the following description of preferred embodiments thereof taken in conjunction with the accompanying drawings.

DETAILED DESCRIPTION OF THE PRIOR ART

Figure 1:
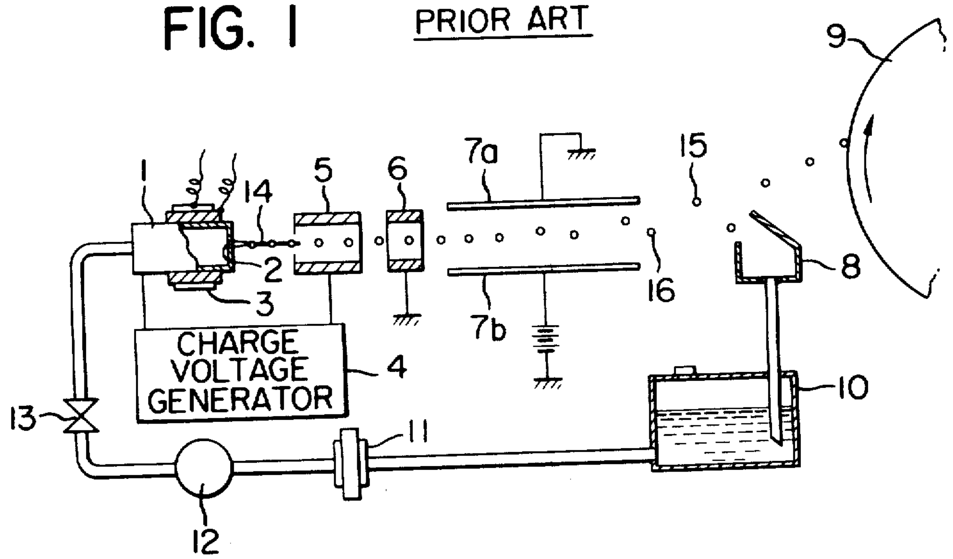
FIG. 1 PRIOR ART
FIG. 1 is a schematic view of an ink-jet printer to which is applied the present invention.

In FIG. 1 is shown in schematic view an ink-jet printer to which is applied the present invention. It includes an ink drop generator or ink-jet head main body 1 with an orifice or nozzle 2 and piezoelectric crystals 3 mounted on the opposing walls, respectively, of the ink drop generator 1, an analog modulated charge voltage generator 4, a charge electrode 5, a charge detection electrode 6, a pair of deflection plates 7a and 7b, a gutter 8, a rotary drum 9, an ink reservoir 10, an ink filter 11, a pump 12 and a regulating valve 13.

As is well known in the art, the ink drop generator 1 pressurizes, excites and emits through the nozzle 2 a continuous ink-jet 14 which in turn is broken up into a stream of ink drops in the charge electrode 5. In response to the charge signals from the charge voltage generator 4, the charge electrode 5 selectively charges the ink drops. The charged ink drop 15 passes through the charge detection electrode 6 to the deflection plates 7a and 7b and is deflected in the electric field between the deflection plates 7a and 7b by an amount proportional to its charge so as to be steered to a predetermined point on the recording paper on the rotary drum 9. By repeating this step, information stored in electronic form is reproduced on the recording paper on the drum 9.

The uncharged ink drops 16 are not deflected and consequently are trapped by the gutter 8 and collected in the ink reservoir 10 for recirculation.

DESCRIPTION OF THE PREFERRED EMBODIMENT

Figure 2:
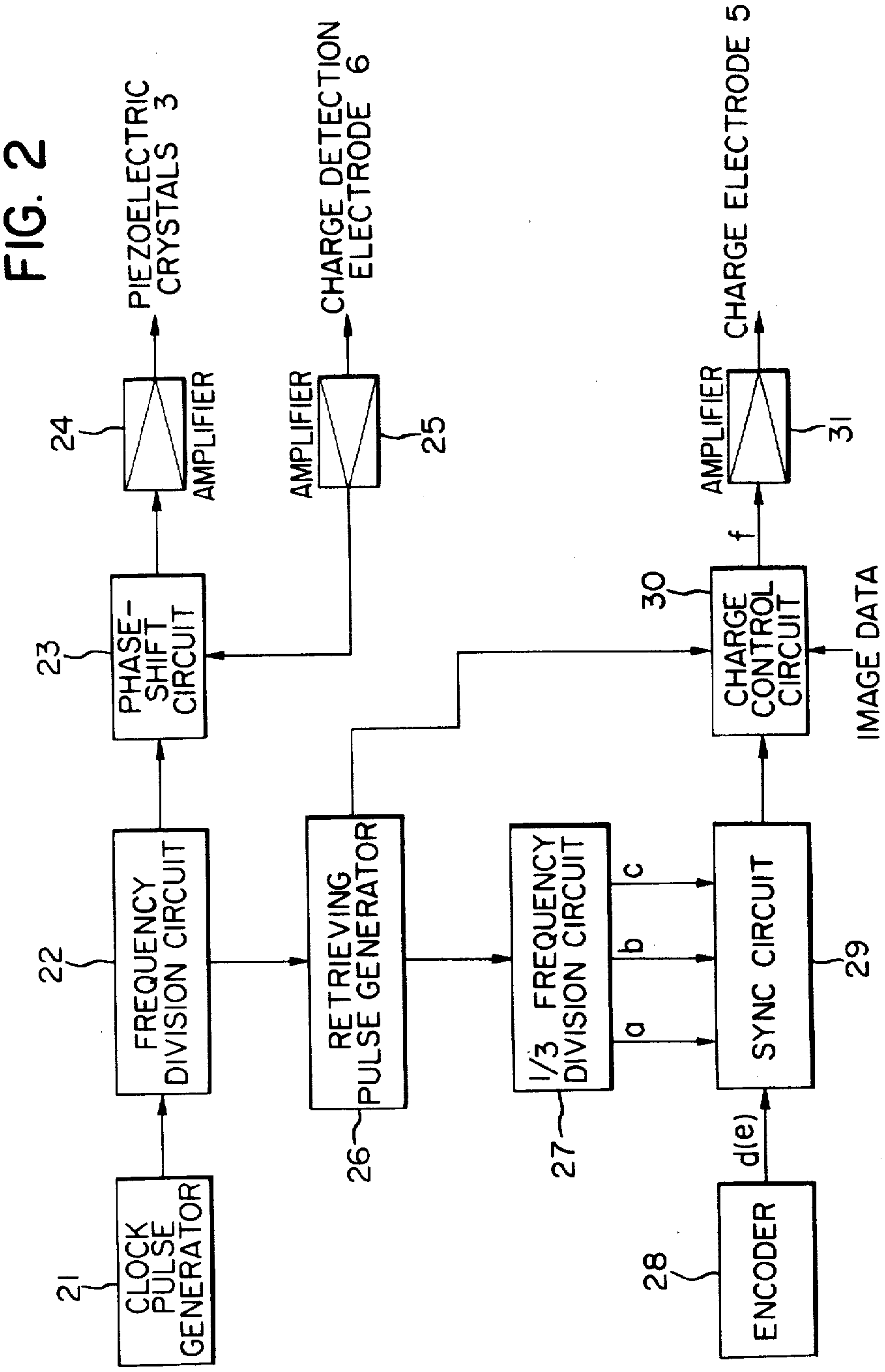
FIG. 2 is an electric block diagram of an embodiment of the present invention.

In FIG. 2 is shown a block diagram of a preferred embodiment of the present invention. A clock pulse generator 21 generates clock pulses at a frequency eight times as high as the excitation frequency, for instance, which is applied to the piezoelectric crystals 3 on the ink drop generator 1 (See FIG. 1). A frequency division circuit 22 steps down the frequency of the clock pulse to $\frac{1}{8}$. More specifically, the frequency division circuit 22 generates a train of pulses whose frequency is $\frac{1}{8}$ of that of the clock pulses and whose duration or width is equal to that of the clock pulses. The output pulses from the frequency division circuit 22 are applied to and shifted by a phase shift circuit 23 in such a way that each pulse is shifted by an amount corresponding to its pulse duration. More specifically, the output signal of the charge detection circuit 6 is applied through an amplifier 25 to the phase shift circuit 23. In response to this output signal, the phase shift circuit 23 selects a phase exactly timed to each breakup of the ink-jet 14 into an ink drop. The output or the excitation signal from the phase shift circuit 23 is applied through an amplifier 24 to the piezoelectric crystals 3.

The phase of the excitation signal, which is timed to each breakup of the ink-jet 14 as described previously, is determined as follows. The output from the frequency division circuit 22 is also applied to a retrieving pulse generator 26 which in turn generates the control signal for controlling a charge control circuit 30 coupled to digital character forming electronics. The charge control circuit 30 in turn applies the charging signal through an amplifier 31 to the charge electrode 5. Meanwhile, the phase shift circuit 23 is controlled in such a way that each excitation signal is shifted by ⅛ period until an ink drop is charged and when the charge detection circuit 6 detects a charged ink drop, the phase shift circuit 23 is deactivated or locked so that the piezoelectric crystals 3 are excited by excitation signals whose phase is locked. Thus, the ink drops can be charged at an optimum excitation phase.

However, in the prior art ink-jet printer "guard drops" are left between the charged ink drops and go to the gutter 8. By throwing away these guard drops into the gutter, the number of ink drops available for printing is, of course, reduced. For instance, when two guard drops are left between the charged ink drops, the charging frequency becomes ⅓ of the excitation frequency. In order to leave two guard drops, the frequency of the retrieving pulses is stepped down to ⅓, so that in a continuous stream of ink drops, they may be charged at two ink-drop intervals. When the emission of an ink drop is exactly synchronized with the charging timing at the start of printing, no ink drop misplacement will occur. However, because of variation in rotation speed of the rotary drum and other reasons, it does not follow that the print-start timing is exactly synchronized with the charging timing, as described previously. As a result, misplacement of one dot at the most will result.

The present invention avoids such misplacement, which causes distortion of the printed image.

Figure 3:
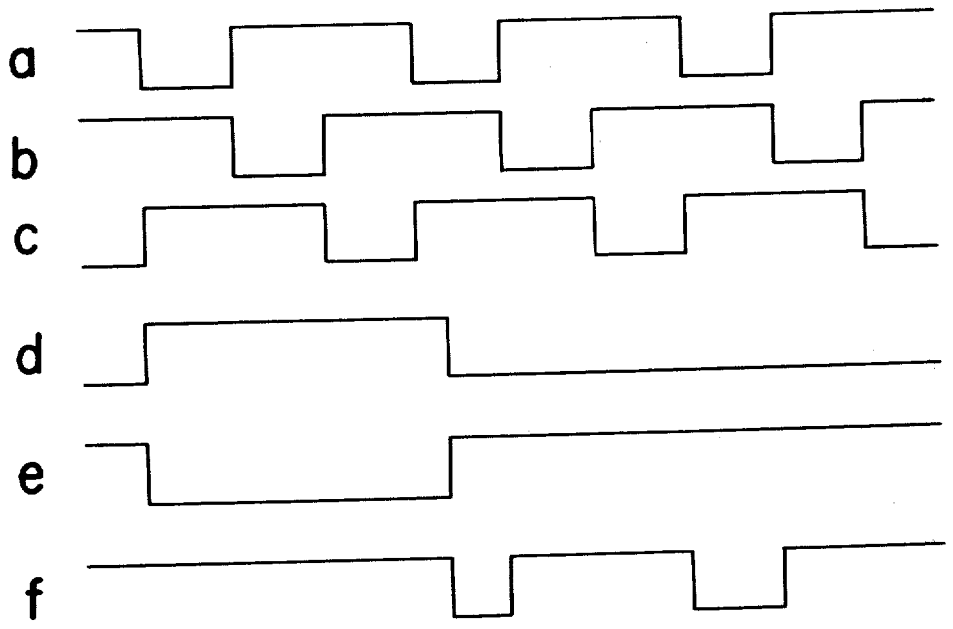
FIG. 3 is a timing chart used for the explanation of the mode of operation of the embodiment shown in FIG. 2.

Still referring to FIG. 2, the frequency of the retrieving pulses from the retrieving pulse generator 26 is stepped down to ⅓, for instance, by a frequency division circuit 27. The frequency division circuit 27 delivers the output or charge-enabling signals a, b and c as shown at a, b and c, respectively, in FIG. 3 to a synchronization or sync circuit 29. Meanwhile, a pulse generator 28 generates a pulse representative of an initial or first rotation of the rotary drum 9 as shown at (d) in FIG. 3, this pulse being referred to as "the print-start" signal. In response to this print-start signal and the charge-enabling signals a, b and c from the ⅓ frequency division circuit 27, the sync circuit 29 delivers to the charge control circuit 30 the charge-enabling pulse a which is synchronized with the charging timing. Then the charge control circuit 30 processes the charge-enabling pulse a and the image forming signal so as to deliver the charge signal or code as shown at (f) in FIG. 3 to the charge electrode 5 through the amplifier 31.

Figure 4:
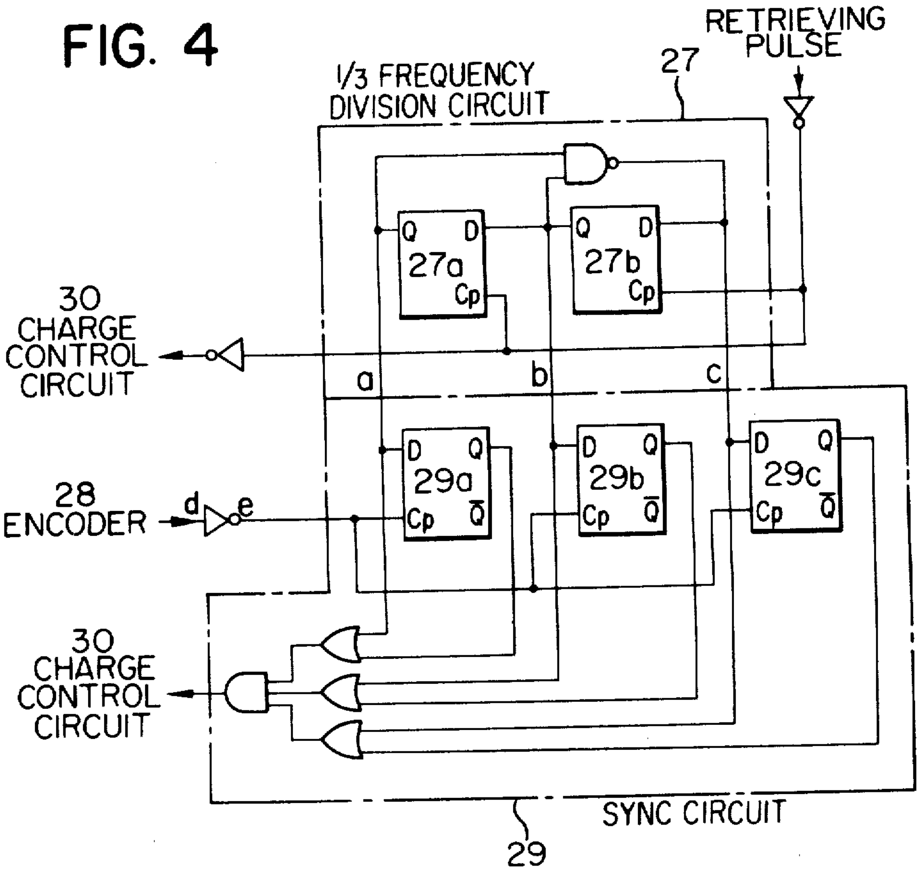
FIG. 4 is a detailed diagram of a $\frac{1}{8}$ frequency division circuit and a sync circuit shown in FIG. 2.

In FIG. 4 are shown the frequency division circuit 27 and the sync circuit 29 comprising D flip-flops. As described previously, D flip-flops 27a and 27b in the frequency division circuit 27 divides the frequency of the retrieving pulses so as to generate the charge-enabling pulses a, b and c. These charge-enabling pulses a, b and c are delivered to D flip-flops 29a, 29b and 29c in synchronism with the falling or trailing edge of the print-start pulse d so that the one of the charge-enabling pulses which is in synchronism with the charging timing is delivered as the charge pulse to the charge control circuit 30.

Thus, according to the present invention, an ink drop the formation of which is closest in time to the generation of the print-start pulse d is used for printing. Therefore, for instance, in the ink-jet printer of the type leaving two guard drops, misplacement can be reduced to ⅓ as compared with the prior art. When the excitation frequency is increased, the rate of misplacement can be further reduced.

Figure 5A:
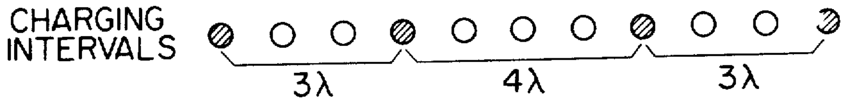
PRIOR ART FIG. 5A
FIGS. 5A and 5B illustrate drawbacks of the prior art.
Figure 5B:
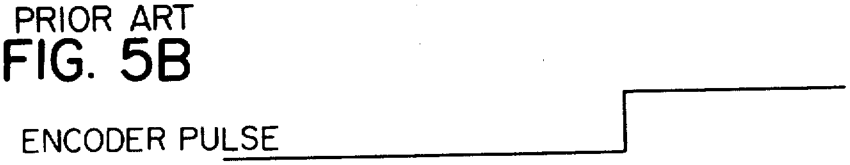
PRIOR ART FIG. 5B

So far, the print-start pulse d has been described as being generated upon each rotation of the rotary drum 9. As a result, quality of the printed images varies at the trailing and leading edge portions of the drum 9. Especially when the rotary drum 9 is driven by a synchronous motor, variations in quality will result from variations in frequency of the AC power source. In order to overcome this problem, there has been devised and demonstrated a system in which synchronization is attained by 384 pulses generated by an encoder for each revolution of a rotary drum. That is, as shown in FIG. 5B the charge pulses are synchronized in response to the encoder pulse, so that the charging interval varies. As a result, too closely spaced apart ink dots or far spaced apart ink dots appear, so that the printed image has a strip pattern.

Figure 6:
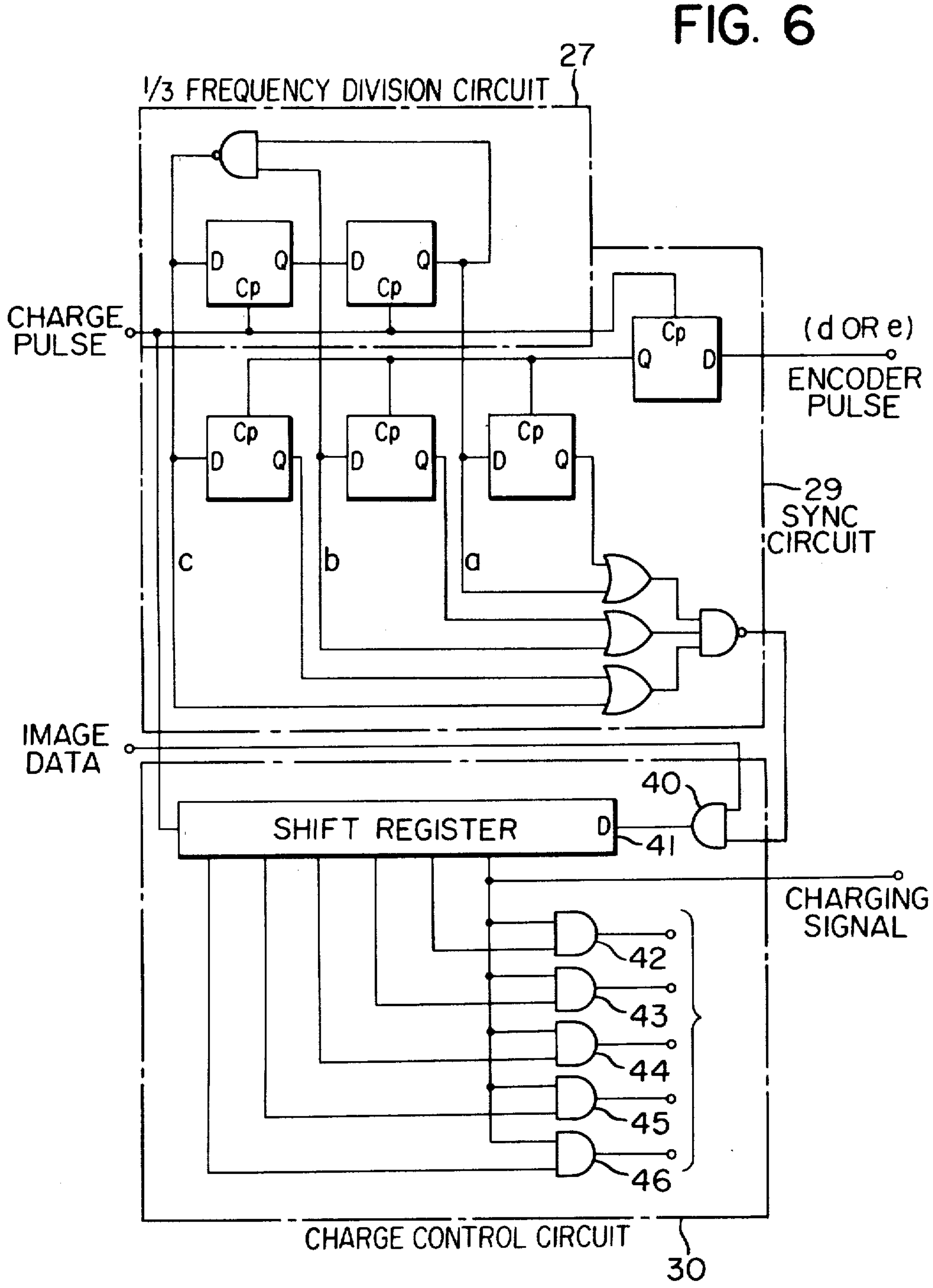
FIG. 6 is a detailed circuit diagram of a $\frac{1}{8}$ frequency division circuit, a sync circuit and a charge control circuit shown in FIG. 2.

In FIG. 6 are shown in detail the ⅓ frequency division circuit 27, the sync circuit 29 and the charge control circuit 30. As described previously, the frequency of retrieving pulse is frequency divided by the division circuit 27 including the D flip-flops so that the charge-enabling pulses a, b and c are delivered to the sync circuit 29. Meanwhile, the encoder pulse is quantized by pulses whose frequency is three times as high as that of the charge pulses (See FIG. 3(*f*)) and consequently is equal to the excitation frequency. In response to one of the charge-enabling pulses a, b or c which is synchronized to the leading edge of the quantized pulse, the image forming signals are sampled by a gate 40 and applied to a shift register 41 so that the charge pulse may be delayed. The shift register 41 delivers the charge pulse which is delayed by one bit to the amplifier 31. Assume that the charging interval is 3λ (See FIG. 5A). Then the normal charge pulse appears at a gate 44. However, when the charging interval changes to 4λ (See FIG. 5A), then the charge pulse appears at a gate 45 so that the gain of the amplifier 31 is controlled in such a way that a corrected charge voltage can be applied. Thus the ink dot position is corrected.

In summary, according to the present invention synchronization is attained in response to the encoder pulses at a high frequency; that is, with a very small pulse spacing so that adverse effects due to the variations in rotation of the rotary drum can be reduced to a minimum and strip patterns due to variations in the interval between charged ink drops can be eliminated and consequently the printed image can be improved in quality.

What is claimed is:

1. An electrostatic type ink-jet printer of the type leaving guard drops between charged drops, comprising:

a rotary drum for supporting a record medium;

an ink jet generator adjacent said drum for providing a stream of ink drops, in response to a corresponding excitation signal;

first pulse generating means for providing said excitation signal at a given frequency;

frequency dividing means for generating polyphase pulse trains synchronous with said excitation signal at a submultiple of said given frequency;

sync pulse generating means coupled to said rotary drum for providing sync pulses at predetermined rotational positions thereof;

a sync circuit responsive to said polyphase pulse trains and said sync pulses for providing charging pulses corresponding to that one of said polyphase pulse trains which contains a pulse coincident with a predetermined part of each of said sync pulses; and means responsive to said charging pulses for charging corresponding ones of said ink drops in said stream provided by said ink drop generator, to charge each ink drop which immediately succeeds a corresponding one of said sync pulses.

2. An electrostatic type ink-jet printer as defined in claim 1, wherein the pulse width of said charging pulses is equal to the period of said excitation signal, and the frequency of said charging pulses is 1/n of that of said excitation signal, wherein n is an integer greater than 1.

3. An electrostatic type ink-jet printer as defined in claim 2, wherein n is 3.

4. An electrostatic type ink-jet printer as defined in claim 1, wherein one sync pulse is generated for each rotation of said rotary drum.

* * * * *